Figure 1:
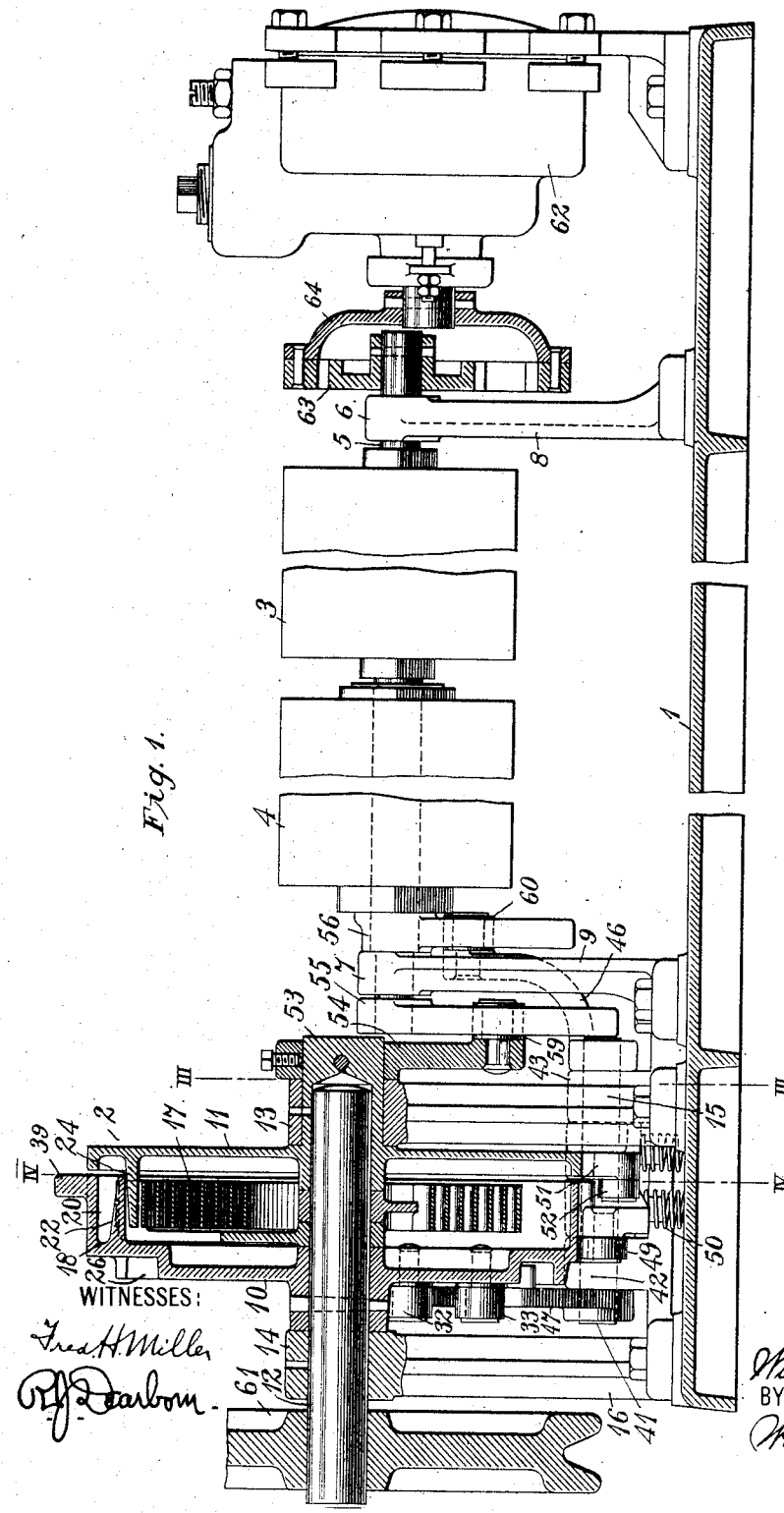

No. 873,264. PATENTED DEC. 10, 1907.
W. A. PARIS.
CONTROLLER FOR ELECTRIC MOTORS.
APPLICATION FILED APR. 5, 1907.

3 SHEETS—SHEET 1.

WITNESSES:
Fred H. Miller
R. J. Dearborn

INVENTOR
William A. Paris
BY
Wesley G. Carr
ATTORNEY

No. 873,264. PATENTED DEC. 10, 1907.
W. A. PARIS.
CONTROLLER FOR ELECTRIC MOTORS.
APPLICATION FILED APR. 5, 1907.
3 SHEETS—SHEET 2.
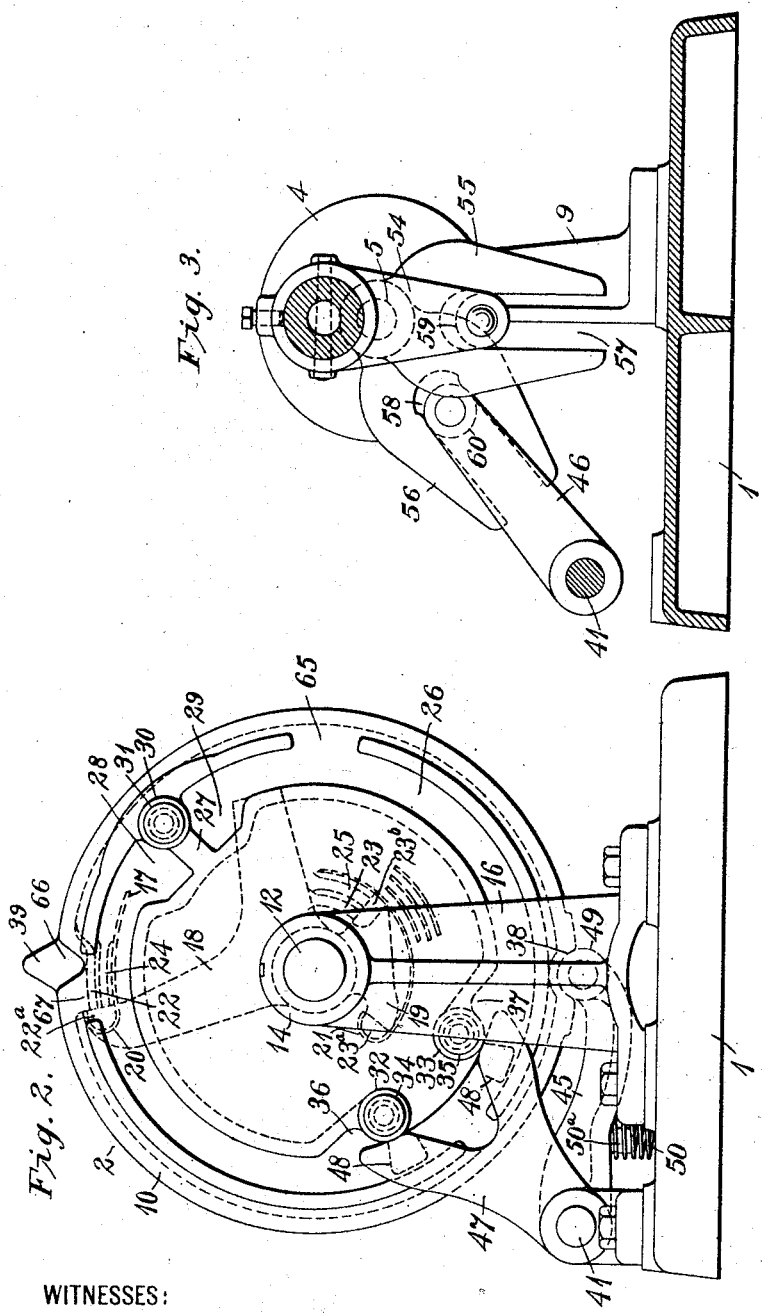
WITNESSES:
INVENTOR
William A. Paris
BY
ATTORNEY No. 873,264. PATENTED DEC. 10, 1907.
W. A. PARIS.
CONTROLLER FOR ELECTRIC MOTORS.
APPLICATION FILED APR. 5, 1907.
3 SHEETS—SHEET 3.
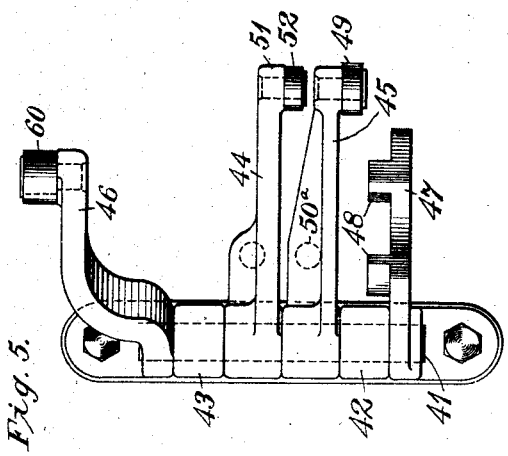
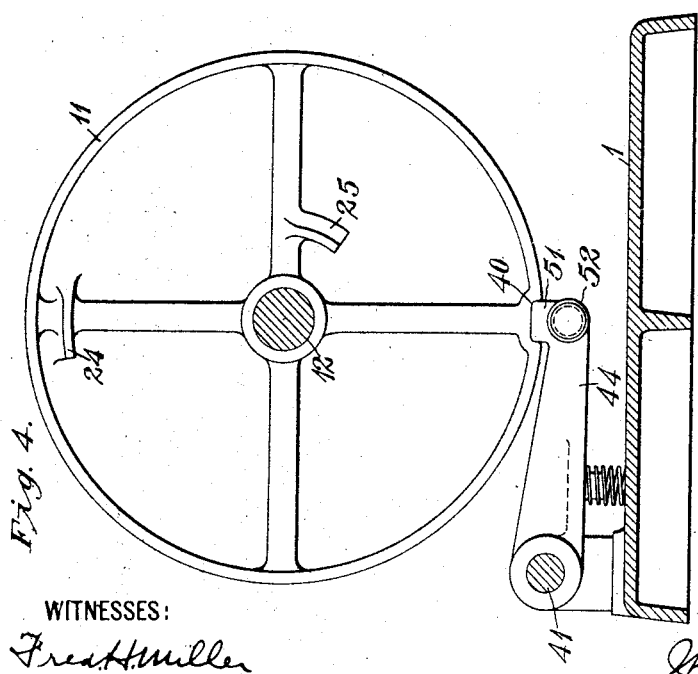
WITNESSES:
INVENTOR
William A. Paris
BY
ATTORNEY

UNITED STATES PATENT OFFICE.

WILLIAM A. PARIS, OF EDGEWOOD PARK, PENNSYLVANIA, ASSIGNOR TO WESTINGHOUSE ELECTRIC & MANUFACTURING COMPANY, A CORPORATION OF PENNSYLVANIA.

CONTROLLER FOR ELECTRIC MOTORS.

No. 873,264.  Specification of Letters Patent.  Patented Dec. 10, 1907.

Application filed April 5, 1907. Serial No. 366,497.

*To all whom it may concern:*

Be it known that I, WILLIAM A. PARIS, a citizen of the United States, and a resident of Edgewood Park, in the county of Allegheny and State of Pennsylvania, have invented a new and useful Improvement in Controllers for Electric Motors, of which the following is a specification.

My invention relates to controllers for electric motors and has special reference to such controllers of the drum type as are adapted to effect automatic acceleration and are operated by spring driving mechanisms.

The object of my invention is to provide, in a controller of the class above indicated, an improved connection between the spring driving mechanism and the drum which is operated thereby, such that the turning moment exerted upon the drum may be substantially constant throughout its range of movement.

Controllers of the drum type have been largely used in the prior art for governing electric motors which were started, stopped and reversed at frequent intervals, as in the operation of elevators and similar apparatus. In order to avoid injury to the motors and their supply sources, these controllers are often so arranged that the rate of acceleration effected is independent of the operator.

The advantages which result from automatic acceleration are well known but difficulties have arisen when spring driving mechanisms were employed for this purpose by reason of the fact that the pressure exerted by the spring or springs varied materially as the drum moved from its "off" position to its motor-operating position. In order to avoid the aforesaid difficulties, I provide improved means for connecting the spring mechanism to the control drum which automatically so compensates for the decrease in spring pressure, as the drum rotates, that the actual turning moment exerted upon the drum is substantially constant.

My invention is illustrated in the accompanying drawings in which

Figure 1 is a view partially in elevation and partially in section, and Fig. 2 an end elevation of a controller constructed in accordance therewith. Figs. 3 and 4 are partially sectional elevations on the lines III—III and IV—IV, respectively, of Fig. 1, and Fig. 5 is a plan view showing the relative position of the levers which form part of the spring driving mechanism.

The same reference numerals are applied to like parts in all of the figures.

Referring to the drawings, the controller here illustrated comprises a base or bed plate 1, a spring driving mechanism 2 and contact-bearing drums 3 and 4 which may be engaged, in the usual manner, by contact fingers (not shown) and are rotatable about a common axis. The drum 3 is keyed or otherwise rigidly attached to a shaft 5 and the drum 4 is rotatably mounted thereon, the shaft being mounted in stationary bearings 6 and 7, with which standards or brackets 8 and 9, upon the base 1, are provided.

The spring driving mechanism 2 comprises a control cam or disk 10 and a driving cam or disk 11 which are respectively attached to and rotatably mounted upon a shaft 12, the axis of which is materially separated from, but parallel to that of the shaft 5. The shaft 12 may rotate freely in stationary bearings 13 and 14 formed in a pair of bearing brackets 15 and 16 that are attached to the base 1. A spiral spring 17, having supports 18 and 19, is interposed between the control cam 10 and the driving cam 11, the extremities of the spring being bent into the form of hooks 20 and 21 that are respectively moved by projections 22 and 23 on the cam 10 and projections 24 and 25 on the cam 11. The spring supports 18 and 19 are rotatably mounted on the shaft 12 and are provided with projections or enlargements $22^a$ and $23^a$ which engage the hooks 20 and 21. The support 19 is also provided with a projection $23^b$ which may engage either one, or both, of the projections 23 and 25 from the cams, the spring support being in this way interposed between the spring hook 21 and the cam projections. The enlargement $22^a$ of the support 18 is interposed between the hook 20 and the cam projections 22 and 24. The cam 10 is provided with an annular groove 26 in its inner surface which is continuous except for a narrow rib 27 adjacent to which the groove is materially enlarged to form notches 28 and 29. A roller 30 is mounted on a pin 31 which projects from the rib 27 and is substantially parallel to the axis of the shaft 12, and two rollers 32 and 33, each similar to roller 30, are mounted on pin projections 34 and 35 adjacent to the inner edge of the groove 26 and diametrically opposite the roller 30. Notches 36 and 37 are provided in the cam 10 adjacent to the rollers 32 and 33 to form enlargements of the groove 26. The periphery of the cam 10 is provided with notches 38 and 66 located at substantially opposite points, and with a projection 39 near the notch 66 but not in the same plane. A notch 40 is also provided in the periphery of the cam 11.

An auxiliary shaft 41 is mounted in bearings 42 and 43 at one side of the base 1, the center line of the shaft being parallel to those of the shafts 5 and 12, but considerably separated laterally from the vertical plane or the axes of the other two shafts. The two pawls 44 and 45 are rotatably mounted upon the shaft 41, between its bearings 42 and 43 and a pawl 46 and a bifurcated lever 47 are attached respectively to the inner and the outer ends of the shaft. Each leg of the lever 47 is provided with a lateral projection 48 which is adapted to engage the groove 26 of the cam 10. The pawl 45 is provided with a roller 49 that engages the periphery of the cam 10 against which it is held by a spring 50 interposed between the base-plate 1 and the pawl, the spring being held in position by a pin projection $50^a$. Predetermined positions in the movement of the cam 10 are accentuated by the engagement of the roller 49 with the notches 38 and 66 in the periphery of the cam. The pawl 44 occupies a position relative to the base 1 similar to that of the pawl 45 and is provided with a projection 51 which locks the cam 11 in a predetermined position by coming into engagement with the notch 40 in its periphery. The projection 39 on the cam 10 is adapted to release the cam 11 by moving into engagement with a roller 52 with which the pawl 44 is provided.

The cam 11 is provided with a hub projection 53 having a pawl 54 that engages a slot 57 in a lever 55 fixed to one extremity of the shaft 5. A lever 56 having a slot 58 is rotatably mounted on the shaft 5, and is attached to the drum 4 and engaged by a roller 60 on the pawl 46. It will be readily observed that the movement of the drum 3 is dependent upon the movement of the cam 11 while the operation of the drum 4 is effected, through pawls 46 and 47 and the shaft 41, by movement of the cam 10. Movement of the cam 10 may be effected by any suitable means, such as a sheave or pulley 61, both the cam and the sheave being fixed to the shaft 12. The operation of the drum 3 may be retarded in a well known manner by a rotary dash-pot 62 connected to the shaft 5 by means of a gear mechanism comprising a spur gear 63 and an annular gear 64 which meshes therewith.

The operation of the controller is as follows: Assuming that the roller 49 on the pawl 45 engages the notch 38 in the cam 10 and that the projection 51 from the pawl 44 engages the notch 40 in the cam 11, which conditions obtain when the drums 3 and 4 occupy their "off" positions, the pawl 47 occupies the position shown in Fig. 2 and the spring 17 is energized to a minimum degree. If the disk 10 and the shaft 12 are turned through 90° in a clockwise direction, the hook 20 of the spring 17 will be held by the projection 24 of the cam 11 and the projection 23 of the cam 10 will engage the projection $23^a$ from the spring support and will energize the spring. The roller 30 will approach one of the projections 48 on the bifurcated lever 47 and, if the rotation of the disk 10 is continued in the same direction, this lever will be turned through a predetermined angle one of the projections 48 passing out of the slot 26 through an opening 65 in the outer wall which is provided for this purpose. The motion thus imparted to the lever 47 is transmitted through the shaft 41 and the pawl 46 to the drum 4 which determines the direction of rotation of the motor that is governed by the controller. As the cam 10 is rotated still further in the same direction, the potential energy imparted to the spring is, of course, increased and the arrangement of the parts is such that the pawl 39 moves into engagement with the roller 52 thereby releasing the cam 11 just as the reversing drum 4 comes to rest. The position which the cam 10 now occupies is accentuated by the engagement of the roller 49 of the pawl 45 with the notch 66 in its periphery. The energy of the spring is now transmitted through the pawl 45 and the lever 55 to the drum 3 which is rotated in opposition to the dash-pot 62, and effects the acceleration of the motor.

The parts which transmit energy from the spring to the drum occupy a relative position as shown in Fig. 3 when the cam 11 is first released and it will be observed that the distance from the point of engagement of the roller 59 with the lever 55 is equal to the difference between the length of the pawl 54 and the distance of separation between the parallel shafts 5 and 12. Furthermore, it will be readily understood that, as the drum rotates through an angle of substantially 90°, the distance, which is a function of the turning moment of the drum, is materially increased, being then equal to the length of the pawl 54 plus the direct distance of separation between the shafts 5 and 12.

The arrangement of parts and the length of the lever arms may be preferably such that the turning moment exerted by the spring is substantially constant throughout the operation of the drum regardless of the fact that the energy exerted by the spring is continually varied. A further motion of the cam 10 in the same direction is prevented by the bifurcated lever 47.

When it is desired to move the controller from the motor-operating position to its off position, the shaft 12 is rotated in a counter-clockwise direction until the projection 51 from the pawl 44 again engages the notch 40. The spring 17 keeps the cams 10 and 11 substantially together during this motion, this part of the operation being dependent entirely upon the attendant.

If the shaft 12 is rotated in a counter-clockwise direction when the control drums occupy their off position, the operation of the controller is similar to that already described except that the drums are turned in an opposite direction, and one of the projections 48 of the bifurcated pawl 47 will engage a groove 67 which corresponds to the groove 65, for the opposite direction of rotation.

It will be readily understood that variations in size and arrangement of details may be effected without departing from the spirit of my invention and I desire that only such limitations be imposed as are indicated in the appended claims.

I claim as my invention:

1. In a controller, the combination with a contact-bearing drum, a driving member, and a resilient connection between said members, of means for exerting a substantially constant turning moment upon the drum as it is moved through a predetermined angle.

2. In a controller, the combination with a contact-bearing drum, a latch for preventing its motion, a driving member, and a resilient connection between them, of means for tripping the latch when a predetermined movement has been imparted to the driving member, and means for exerting a substantially constant turning moment upon the drum as it is moved through a predetermined angle.

3. In a controller, the combination with a driven member, means for temporarily preventing motion thereof, a driving member, and a resilient connection between the two members, of means for releasing the driven member when a predetermined movement has been imparted to the driving member, and means for exerting a substantially constant force during a predetermined motion of the driven member.

4. In a controller, the combination with a contact-bearing member, a driving cam, a driven cam, and a resilient connection between the cams, of connecting means interposed between the driven cam and the contact-bearing members for varying the ratio of forces transmitted from the driving cam to the contact-bearing member.

5. In a controller, the combination with a contact-bearing drum, a driving cam, a driven cam, and a spiral spring connecting the two cams, of means interposed between the driven cam and the contact-bearing member for varying the ratio of forces transmitted from the driving cam to the contact-bearing member.

6. In a controller, the combination with a contact-bearing drum, a driving cam, a driven cam, a latch therefor, and a spiral spring connection between the two cams, of means for tripping the latch to release the driven cam when the driving cam is moved through a predetermined angle, and means for varying the ratio of forces transmitted from the driven cam to the drum.

7. In a controller, the combination with two rotatably mounted contact-bearing drums having coincident axes, a driving cam, a driven cam, a latch therefor, a spiral spring forming a connection between the cams, and a projection on the driving cam that trips the latch at a predetermined point in its motion, of means for varying the ratio of power transmitted from the driving cam to one of the drums, and means for driving the other drum and completing its motion before the first drum is released.

In testimony whereof, I have hereunto subscribed my name this 29th day of March, 1907.

WILLIAM A. PARIS.

Witnesses:
 EDWIN LEHR,
 BIRNEY HINES.